United States Patent Office 3,336,126
Patented Aug. 15, 1967

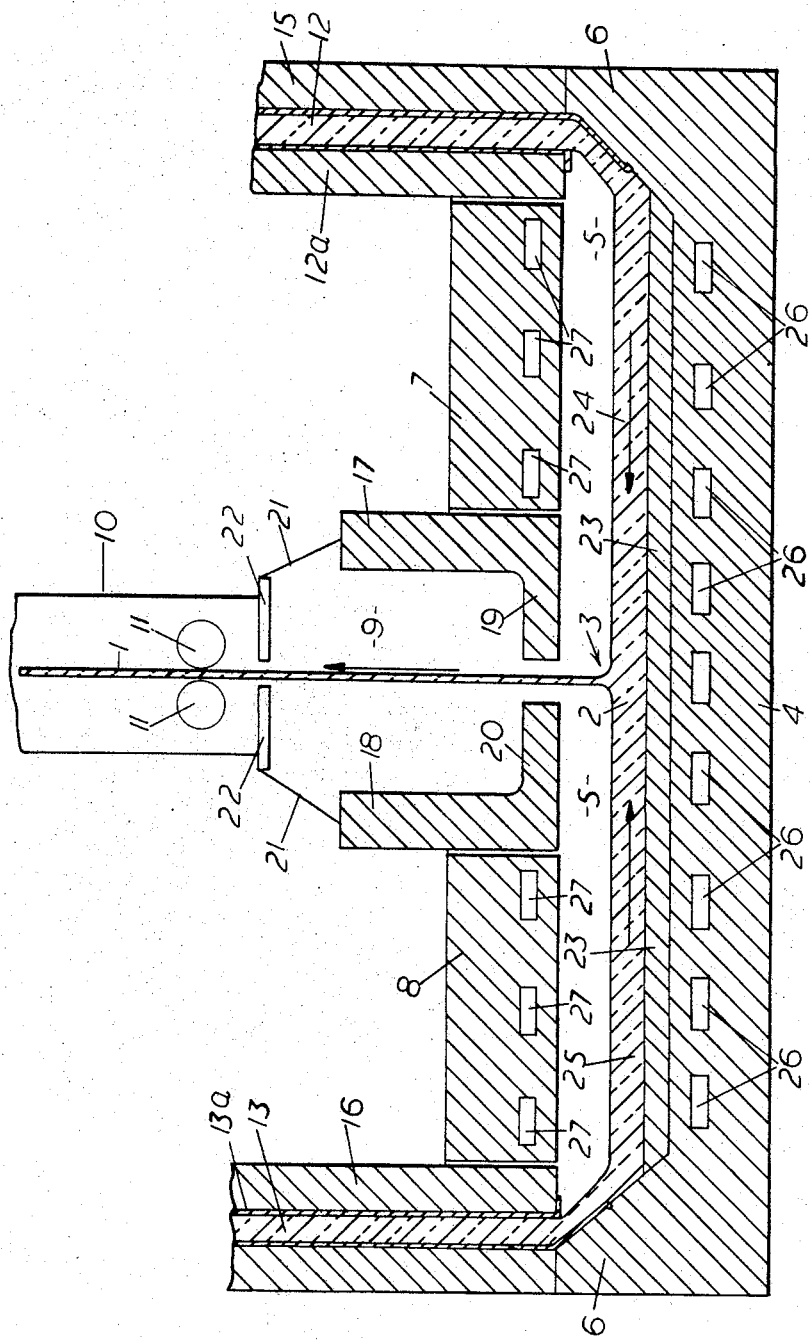

3,336,126
APPARATUS FOR THE CONTINUOUS PRODUCTION OF FLAT GLASS WITH DUAL FEEDING MEANS
David Frost Pilkington, Aughton, near Ormskirk, England, assignor to Pilkington Brothers Limited, Liverpool, England, a corporation of Great Britain
Filed Nov. 19, 1963, Ser. No. 324,789
Claims priority, application Great Britain, Nov. 20, 1962, 43,924/62
5 Claims. (Cl. 65—203)

This invention relates to methods of and apparatus for drawing flat glass and in particular to drawing flat glass upwardly from the surface of a body of molten glass.

As is well known, sheet or window glass is usually produced by drawing a flat sheet of glass from a surface of a bath of molten glass. However, temperature inequalities and undesirable currents in the glass as it approaches the meniscus at the line of draw lead to undesirable variations in viscosity across the width of the sheet of glass as it is drawn, which viscosity variations result in distortions in the drawn sheet of glass.

Further the glass which is fed to the two sides of the meniscus at the line of draw have differing thermal histories due to the differing path lengths from the melting furnace to the two sides of the meniscus, which leads to distortions in the glass.

It is also known that in vertical drawing processes glass which is in contact with refractories becomes contaminated and this contamination leads to distortion of the glass.

It is a main object of the present invention to avoid the disadvantage of undesirable local variations in viscosity across the width of the sheet of glass as it is drawn.

A further object of the invention is to provide symmetrical flow of glass having the same or similar thermal history into the two sides of the meniscus at the line of draw.

Another object of the invention is to provide a method of drawing flat glass upwardly from the surface of a body of molten glass in which refractory contamination of the drawn sheet is minimised without engendering a return flow of cooled contaminated glass to the melting furnace.

From its broadest aspect a method of upwardly drawing flat glass is characterised, according to the invention, by individually forming on the surface of molten metal two oppositely moving, similar streams of molten glass, and advancing said streams along the molten metal towards the line of draw where the streams merge to form a body of molten glass from which the flat glass is drawn upwardly, whereby contact of the streams with the molten metal minimises local temperature variations in the glass approaching the line of draw.

From another aspect of the invention comprehends a method of drawing a sheet of glass upwardly from the surface of a body of molten glass, comprising individually feeding molten glass to opposite ends of an elongated bath of molten metal at a controlled rate commensurate with the rate of drawing the sheet, minimising local temperature variations in the glass approaching the line of draw by advancing the molten glass along the bath as two oppositely moving similar streams of molten glass moving towards the line of draw one from each side of that line, which streams merge to form said body of molten glass supported on the bath of molten metal, and drawing a sheet of glass upwardly from said body of molten glass.

By advancing the molten glass along the bath of molten metal as two oppositely moving similar streams of molten glass moving towards the line of draw, there is symmetry of flow of molten glass into the line of draw, and the invention further comprehends controlling the rate of flow of the molten glass in said streams to maintain symmetrical flow of molten glass into the line of draw from either side.

Further according to the invention the overall temperature of each of the two streams is regulated as the streams are advanced to give substantially identical temperature conditions in the two streams of glass approaching the two sides of the line of draw.

The invention further provides for assisting regulation of the overall temperature of the glass in said streams by heat exchange with the upper surfaces of the streams.

The invention also comprehends apparatus for continuously drawing flat glass upwardly from a surface of a body of molten glass, characterised by the molten glass being located in a squat tunnel having a width greater than the width of the sheet to be drawn, said tunnel including a roof, an elongated tank structure holding a bath of molten metal for supporting said body of molten glass, and side walls connecting the roof and tank structure, a shaft opening out of the tunnel at a middle area of the tunnel and extending upwardly from the roof of the tunnel, means for drawing the sheet and raising the drawn sheet through the shaft, conduits for leading molten glass into each end of the tunnel to maintain the body of molten glass established on the bath by flow of molten glass along the bath from each end of the tunnel towards said middle area, whereby contact of the molten glass with the molten metal bath as the glass is advanced along the bath minimises local temperature variations in the glass approaching the line of draw.

In a preferred embodiment of apparatus according to the invention the tank floor slopes downwardly into the tunnel from each end of the tunnel to lead molten glass from the conduits on to the surface of the bath. The conduits may be platinum lined in order to minimise refractory contamination of the molten glass fed on to the bath.

For the application of the invention to methods in which flat glass is drawn through a vertical annealing lehr, the lower part of the shaft is formed by a drawing chamber supported in the roof of the tunnel, and the upper part of the shaft is constituted by an annealing lehr extending upwardly from the drawing chamber.

Alternatively in the application of the invention to the Colburn process of drawing flat glass, said shaft is constituted by a drawing chamber extending from the roof of the tunnel to a horizontal bending roll over which the glass is bent for delivery into a horizontal annealing lehr.

The invention also comprehends flat glass produced by a method as set out above, and sheets of glass cut therefrom.

In order that the invention may be more clearly understood a preferred embodiment thereof will now be described by way of example, with reference to the drawing accompanying the provisional specification which shows apparatus for drawing a sheet of flat glass upwardly from the surface of a body of molten glass supported on a bath of molten metal.

Referring to the drawing, apparatus for vertically drawing a sheet 1 of flat glass upwardly from the surface of a body 2 of molten glass incorporating the line of draw 3, comprises a squat tunnel having a width greater than the width of the sheet to be drawn. The tunnel includes a roof, a hearth 4 for supporting said body of molten glass 2, and side walls 5 connecting the roof and hearth.

The hearth has upwardly extending end walls 6, and the roof includes two curtain roof elements 7 and 8 extending inwardly from the ends of the hearth 4.

A shaft opens out from the roof and extends upwardly therefrom, and the lower part of the shaft has the form of a drawing chamber 9 opening out of the tunnel at a middle area of the tunnel between the roof elements 7 and 8. The upper part of the shaft is constituted by a vertical annealing lehr 10 extending upwardly from the top of the drawing chamber 9.

The sheet 1 of glass is drawn upwardly from the surface of the body 2 of molten glass and through the drawing chamber 9 by pairs of drawing rollers 11 mounted in the bottom of the vertical lehr 10, that is, at the entry end of the lehr. The rollers 11 represent the lower pair of a superimposed series of pairs of rollers which raise the drawn sheet 1 through the annealing lehr 10.

Two channels, shown as conduits 12 and 13 lead into either end of the tunnel, the conduits being vertical conduits which individually deliver molten glass downwardly. The conduits 12 and 13 extend through refractory structures 15 and 16 which close the ends of the tunnel between the end walls 6 of the hearth and the roof elements 7 and 8.

In order to feed similar molten glass to either end of the tunnel, both conduits 12 and 13 preferably deliver molten glass from the same melting furnace, but the conduits 12 and 13 may feed molten glass from independent melting furnaces.

The drawing chamber 9 which is arranged in the roof structure includes two L-blocks 17 and 18 whose bottom faces are level with the lower faces of the roof elements 7 and 8 so that the lower faces of the L-blocks are close to the surface of the shallow body 2 of molten glass. The toes 19 and 20 of the L-blocks extend inwardly close to the sheet of glass 1 being drawn.

The drawing chamber is completed by walls indicated diagrammatically at 21 and by cullet collectors 22 of well known kind.

The hearth 4 is formed as an elongated structure holding a bath 23 of molten metal, for example molten tin or an alloy of tin. The depth of the bath of molten metal is at least ¾ inch, but similarly the depth of the shallow body of molten glass 2 is at least ¼ inch.

Each of the end walls 6 of the hearth form the end walls of the tank structure and are sloped so that two similar streams 24 and 25 of molten glass are individually fed from the conduits 12 and 13, one towards each side of the intended line of draw 3, said streams 24 and 25 being constituted as two oppositely moving layers of molten glass which flow over the surface of the molten metal bath 23 and merge at the line of draw. The total volume of molten glass entering the streams 24 and 25 is controlled to be commensurate with the rate of drawing the sheet 1 from the shallow body 2 of molten glass so that in the embodiment illustrated substantially unidirectional flow of molten glass is assured along the surface of the bath symmetrically in opposite directions towards each side of the meniscus at the line of draw, and there are no stagnant pockets of cooled glass in the tunnel.

Any local temperature variations in the streams of glass 24 and 25 are minimised because the glass is in contact with the molten metal bath 23 throughout its advance through the tunnel. The high thermal conductivity of the molten metal bath ensures that local temperature variations in the glass are substantially eliminated.

The overall temperature of the glass in the two streams 24 and 25 flowing towards the line of draw is regulated to give substantially identical temperature conditions in the two streams approaching the two sides of the line of draw. To this end the temperature of the bath 23 of molten metal is controlled by temperature regulators 26 mounted in the hearth 4 underneath the bath of molten metal. The provision of identical thermal conditions, or substantially so, on either side of the line of draw stabilises the position of the line of draw centrally under the drawing chamber 9.

To assist regulation of the overall temperature of the molten glass in the streams 24 and 25 as they approach the line of draw, temperature regulators 27 are mounted in the roof elements 7 and 8 to control the temperature of the streams of glass 24 and 25 by heat exchange with the roof of the tunnel.

Radiation absorption coolers may be provided on the toes 19 and 20 of the L-blocks near the line of draw and the edges of the drawn sheet 1 may be engaged by edge rolls or edge forks in well known manner.

In order to minimise refractory contamination of the glass delivered to the bath the conduits 12 and 13 are preferably lined with platinum, and the platinum linings 12a, 13a extend over the sloping faces of the hearth end walls 5 so that the two streams of molten glass delivered into the tunnel are only momentarily in contact with refractory as they flow on to the molten metal bath.

Because, in the embodiment described, the shallow mobile layer of molten glass from which the sheet is drawn is maintained by independent symmetrical flows of molten glass with the same thermal history, or substantially so, into the meniscus at the line of draw, the total flow being commensurate with the rate of drawing the sheet, the whole of the glass from the conduits flows forwardly to the line of draw and there are no undesirable currents in the glass.

The conduits 12 and 13 through which streams of molten glass are delivered into the ends of the tunnel may be, for example, of rectangular or circular cross-section narrower than the width of the bath 23 of the molten metal. The molten glass spreads laterally to cover the molten metal bath at each end of the tunnel, and flows forwardly along the bath surface to form said streams of molten glass 24 and 25 which have substantially the same thermal history.

In an alternative embodiment of the invention as applied to the Colburn process of drawing flat glass, the drawing chamber extends from the roof of the tunnel to a horizontal bending roll over which the glass 1 drawn upwardly from the surface of the body 2 of molten glass is bent for delivery into a horizontal annealing lehr.

The invention also comprehends flat glass produced by the method described herein and sheets of glass cut therefrom.

I claim:

1. Apparatus for continuously drawing flat glass upwardly from the surface of a body of molten glass, characterised by the molten glass being located in a squat tunnel having a width greater than the width of the sheet to be drawn, said tunnel including a roof, an elongated tank structure holding an elongated bath of molten metal for supporting said body of molten glass, and side walls connecting the roof and tank structure, a shaft opening out of the tunnel at a middle area of the tunnel and extending upwardly from the roof of the tunnel, means for drawing the sheet and raising the drawn sheet through the shaft, equal and symmetrical conduits for leading molten glass into each end of the tunnel to maintain the body of molten glass established on the bath by flow of molten glass from each end of the tunnel towards said middle area, whereby contact of the molten glass with the molten metal bath as the glass is advanced along the elongated bath minimises local temperature variations in the glass approaching the line of draw.

2. Apparatus according to claim 1, wherein the tank floor slopes downwardly into the tunnel from each end of the tunnel to lead molten glass downwardly from the conduits on to the surface of the bath.

3. Apparatus according to claim 1, wherein said conduits are platinum lined.

4. Apparatus according to claim 1, wherein the lower part of the shaft is formed by a drawing chamber supported in the roof of the tunnel, and the upper part of the shaft is constituted by an annealing lehr extending upwardly from the drawing chamber.

5. Apparatus for drawing a sheet of glass upwardly from the surface of a body of molten glass, comprising means for drawing a sheet of glass upwardly from a generally central portion of a body of molten glass; means poviding an elongated bath of molten metal; means for individually feeding molten glass to opposite ends of the elongated bath of molten metal at a controlled rate commensurate with the rate of drawing the sheet and for advancing the molten glass along the bath as two oppositely moving, similar, elongated streams of molten glass moving toward the line of draw, one from each side of that line, which streams merge to form said body of molten glass supported on said bath of molten metal; means for minimizing, between each point of feeding and the line of draw, local temperature variations in the glass approaching the line of draw; and means for individually regulating the rate of feeding of molten glass to the opposite ends of the elongated bath of molten metal and into said streams to maintain equal and symmetrical flow of molten glass into the line of draw from either side.

References Cited

UNITED STATES PATENTS

| | | | |
|---|---|---|---|
| 1,999,591 | 4/1935 | Halbach | 65—65 |
| 2,928,212 | 3/1960 | Long | 65—374 X |
| 3,218,143 | 11/1965 | DeLajarte | 65—99 X |

DONALL H. SYLVESTER, *Primary Examiner.*

R. BAJEFSKY, *Assistant Examiner.*